United States Patent
Kocatulum et al.

(10) Patent No.: US 11,242,275 B2
(45) Date of Patent: Feb. 8, 2022

(54) APPARATUS TO CONTROL GLASS FLOW INTO GLASS FORMING MACHINES

(71) Applicant: CORNING INCORPORATED, Corning, NY (US)

(72) Inventors: Bulent Kocatulum, Horseheads, NY (US); Pierre Laronze, Corning, NY (US); Sara Ashley Manley, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 378 days.

(21) Appl. No.: 16/469,446

(22) PCT Filed: Dec. 13, 2017

(86) PCT No.: PCT/US2017/065943
§ 371 (c)(1),
(2) Date: Jun. 13, 2019

(87) PCT Pub. No.: WO2018/111951
PCT Pub. Date: Jun. 21, 2018

(65) Prior Publication Data
US 2020/0095152 A1 Mar. 26, 2020

Related U.S. Application Data

(60) Provisional application No. 62/434,655, filed on Dec. 15, 2016.

(51) Int. Cl.
*C03B 17/00* (2006.01)
*C03B 7/088* (2006.01)
(Continued)

(52) U.S. Cl.
CPC ............... *C03B 7/088* (2013.01); *C03B 5/26* (2013.01); *C03B 7/098* (2013.01); *C03B 17/064* (2013.01)

(58) Field of Classification Search
CPC .............................................. C03B 17/00–068
See application file for complete search history.

(56) References Cited

U.S. PATENT DOCUMENTS 4,244,722 A * 1/1981 Tsuya .................. C03B 17/06
264/211
H128 H 9/1986 Routt
(Continued)

FOREIGN PATENT DOCUMENTS

| CN | 102849926 A | 1/2013 |
| EP | 1832558 A1 | 9/2007 |

(Continued)

OTHER PUBLICATIONS

Chinese Patent Application No. 201780077741.1, Office Action dated Jun. 30, 2021, 9 pages (5 pages of English Translation and 4 pages of Original Document), Chinese Patent Office.
(Continued)

*Primary Examiner* — Jodi C Franklin
(74) *Attorney, Agent, or Firm* — Matthew B. McNutt; Ryan T Hardee

(57) ABSTRACT

A glass forming apparatus includes a glass delivery vessel, a forming body with a forming body inlet and a downcomer (48) between the glass delivery vessel and the forming body. The downcomer includes a downcomer tube (100) with an inlet end (110) for receiving molten glass from the glass delivery vessel and an outlet end (109) for discharging molten glass to the forming body inlet. An upper heating zone (110) and a lower heating zone (150) positioned downstream from the upper heating zone (110) encircle the downcomer tube and a lower controlled atmosphere enclosure (155) is positioned around and sealed to the downcomer tube (100) in the lower heating zone (150). The lower controlled atmosphere enclosure (155) includes at least one
(Continued)

heating element (156) for heating molten glass flowing through the downcomer tube within the forming body inlet.

12 Claims, 8 Drawing Sheets

(51) Int. Cl.
    *C03B 5/26*     (2006.01)
    *C03B 7/098*     (2006.01)
    *C03B 17/06*     (2006.01)

(56) References Cited

U.S. PATENT DOCUMENTS

| | | | | |
|---|---|---|---|---|
| 4,726,831 | A * | 2/1988 | Fogle | C03B 5/26 65/128 |
| 5,112,378 | A * | 5/1992 | Weisenburger | C03B 5/005 373/33 |
| 5,820,652 | A * | 10/1998 | Bernard | G21F 9/305 65/325 |
| 6,405,564 | B1 * | 6/2002 | Takei | C03B 5/1675 65/134.2 |
| 6,422,861 | B1 * | 7/2002 | Antczak | C03B 5/43 432/13 |
| 7,681,414 | B2 * | 3/2010 | Pitbladdo | C03B 17/067 65/193 |
| 8,019,206 | B2 * | 9/2011 | Hirabara | C03B 5/2252 392/323 |
| 8,065,892 | B2 | 11/2011 | Kano | |
| 8,240,170 | B2 * | 8/2012 | De Angelis | C03B 5/167 65/157 |
| 8,375,747 | B2 | 2/2013 | De Angelis et al. | |
| 9,073,771 | B2 * | 7/2015 | Goller | C03B 5/225 |
| 9,935,827 | B2 | 4/2018 | Jain et al. | |
| 2003/0029199 | A1 * | 2/2003 | Pitbladdo | C03B 17/064 65/195 |
| 2006/0016219 | A1 * | 1/2006 | Pitbladdo | G01F 1/6888 65/29.21 |
| 2006/0242996 | A1 * | 11/2006 | DeAngelis | C03B 5/1677 65/134.1 |
| 2008/0034798 | A1 * | 2/2008 | Bergman | C03B 7/02 65/90 |
| 2009/0038342 | A1 * | 2/2009 | Pitbladdo | C03B 17/064 65/27 |
| 2009/0217708 | A1 * | 9/2009 | DeAngelis | C03B 5/16 65/134.2 |
| 2010/0199721 | A1 * | 8/2010 | Antoine | C03B 5/23 65/134.9 |
| 2011/0203321 | A1 * | 8/2011 | De Angelis | C03B 5/163 65/45 |
| 2011/0277504 | A1 * | 11/2011 | Pitbladdo | C03B 17/064 65/53 |
| 2012/0125050 | A1 | 5/2012 | Murakami | |
| 2012/0266633 | A1 * | 10/2012 | De Angelis | C03B 7/08 65/66 |
| 2013/0333420 | A1 * | 12/2013 | Goller | C03B 17/04 65/90 |
| 2014/0144183 | A1 * | 5/2014 | Demirbas | C04B 35/64 65/134.4 |
| 2017/0283294 | A1 * | 10/2017 | Delia | C03B 5/43 |
| 2018/0297882 | A1 * | 10/2018 | De Angelis | C03B 5/44 |

FOREIGN PATENT DOCUMENTS

| | | |
|---|---|---|
| EP | 2363381 A1 | 9/2011 |
| JP | 2003054954 A | 2/2003 |
| TW | 201619072 A | 6/2016 |
| WO | 2016/053773 A1 | 4/2016 |
| WO | 2018052869 A1 | 3/2018 |
| WO | 2018222984 A2 | 12/2018 |

OTHER PUBLICATIONS

Taiwanese Patent Application No. 106143502, Office Action dated Jul. 8, 2021, 3 pages (English Translation Only); Taiwanese Patent Office.

International Search Report and Written Opinion of the International Searching Authority; PCT/US2017/065943; dated May 3, 2018; 21 Pages; European Patent Office.

Invitation To Pay Additional Fees From the International Searching Authority; PCT/US2017/065943; dated Mar. 8, 2018; 18 Pages; European Patent Office.

\* cited by examiner

APPARATUS TO CONTROL GLASS FLOW INTO GLASS FORMING MACHINES

CROSS-REFERENCE TO RELATED APPLICATIONS

This application is a national stage entry of International Patent Application Serial No. PCT/US2017/065943, filed on Dec. 13, 2017, which in turn, claims the benefit of priority under 35 U.S.C. § 119 of U.S. Provisional Application Ser. No. 62/434,655 filed on Dec. 15, 2016, the contents of each of which are relied upon and incorporated herein by reference in their entireties.

BACKGROUND

Field

The present specification generally relates to glass forming apparatuses and, more specifically, to methods and apparatuses for controlling glass flow through a downcomer into glass forming machines.

Technical Background

The fusion process is one technique for forming glass ribbons. Compared to other processes for forming glass ribbons, such as the float and slot-draw processes, the fusion process produces glass ribbons with a relatively low amount of defects and with surfaces having superior flatness. As a result, the fusion process is widely employed for the production of glass substrates that are used in the manufacture of LED and LCD displays and other substrates that require superior flatness and smoothness.

In the fusion process, molten glass is fed from a delivery vessel, through a downcomer and into an inlet end of a forming body. The molten glass flows over opposing surfaces of the forming body and rejoins or fuses at a bottom edge of the forming body, from which a continuous ribbon of glass is drawn. The downcomer is designed to deliver molten glass at a given viscosity to the inlet end of the forming body. Temperature variations in the molten glass supplied to the inlet end of the forming body through the downcomer alters the viscosity of the molten glass which, in turn, affects the flow of the molten glass and may result in forming defects that degrade the quality of the resultant glass ribbon drawn from the root of the forming body.

Accordingly, a need exists for alternative methods and apparatuses for controlling glass flow through a downcomer during glass ribbon forming.

SUMMARY

According to one embodiment, a downcomer for a glass forming apparatus includes a downcomer tube with an inlet end for receiving molten glass and an outlet end for discharging molten glass to an inlet of a forming body. An upper heating zone and a lower heating zone positioned downstream of the upper heating zone proximate the outlet end encircle the downcomer tube. A lower controlled atmosphere enclosure is positioned around and sealed to the downcomer tube in the lower heating zone. The lower controlled atmosphere enclosure includes at least one heating element. A transition flange is coupled to and encircles the downcomer tube between the upper heating zone and the lower heating zone. A bottom flange positioned downstream from the transition flange is coupled to and encircles the downcomer tube. An outer shield encircles the downcomer tube and is connected to the transition flange and the bottom flange such that the outer shield, the transition flange, and the bottom flange form the lower controlled atmosphere enclosure around the downcomer tube.

According to another embodiment, a downcomer for a glass forming apparatus comprising a molten glass delivery vessel and a forming body comprising a forming body inlet includes a downcomer tube with an upper heating zone, a lower heating zone positioned downstream of the upper heating zone and a transition flange coupled to and encircling the downcomer tube between the upper heating zone and the lower heating zone. The transition flange includes an outer flange, an inner flange and an expansion drum extending between the outer flange and the inner flange. The expansion drum comprises an "S" configuration with an upper portion of the expansion drum sealingly coupled to the outer flange and a lower portion of the expansion drum sealingly coupled to the inner flange. The expansion drum may be integrally formed with the upper portion and the lower portion with the lower portion transitioning into the upper portion through a pair of shoulders arranged in the "S" configuration.

In another embodiment, a method for forming glass ribbon includes flowing molten glass through a downcomer tube and heating the molten glass flowing through the downcomer tube with an upper heating zone and a lower heating zone encircling the downcomer tube. The lower heating zone is positioned downstream from the upper heating zone proximate an outlet end of the downcomer tube. The molten glass is discharged through the outlet end of the downcomer tube into a forming body inlet of a forming body with a portion of the outlet end and the lower heating zone positioned within the forming body inlet. The molten glass discharged from the outlet end of the downcomer tube flows into a trough of a forming body, over a pair of weirs bounding the trough and down a pair of forming surfaces extending from the pair of weirs and converging at a root of the forming body, wherein glass flowing down the pair of forming surfaces converges at the root of the forming body and forms a glass ribbon.

Additional features and advantages of the glass forming apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

DETAILED DESCRIPTION

Figure 2:
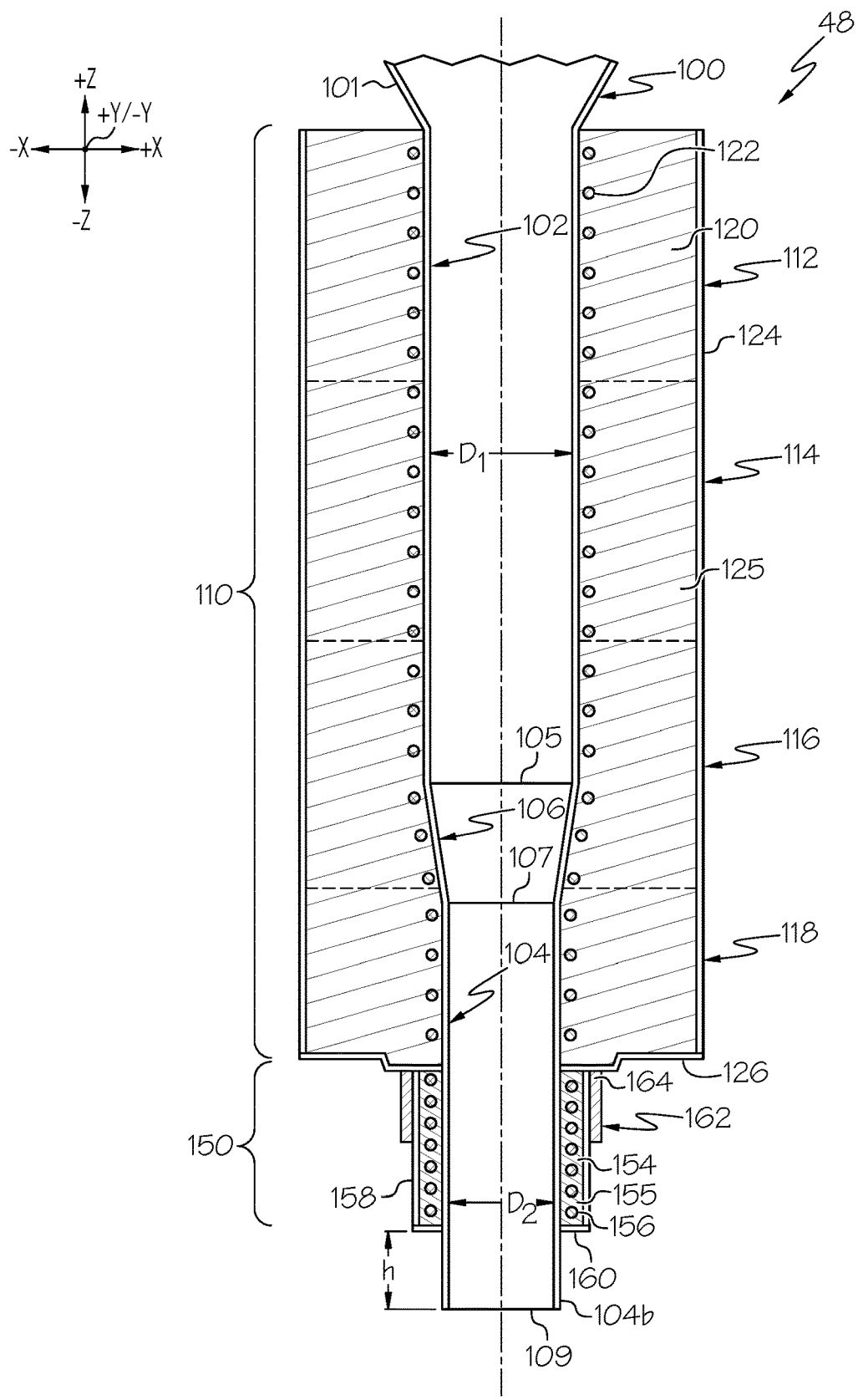
FIG. 2 schematically depicts a cross section of a downcomer of a glass forming apparatus with an upper heating zone and a lower heating zone according to one or more embodiments shown and described herein.

Reference will now be made in detail to embodiments of downcomers for glass forming apparatuses, examples of which are illustrated in the accompanying drawings. Whenever possible, the same reference numerals will be used throughout the drawings to refer to the same or like parts. An exemplary embodiment of a downcomer is schematically depicted in FIG. 2. The downcomer may include a downcomer tube with an inlet end for receiving molten glass and an outlet end for discharging molten glass. An upper heating zone is positioned adjacent the inlet end and a lower heating zone is positioned downstream of the upper heating zone proximate the outlet end of the downcomer tube. The upper heating zone comprises insulation and at least one heating element. A lower controlled atmosphere enclosure is positioned around and sealed to the downcomer tube in the lower heating zone. The lower controlled atmosphere enclosure comprises at least one heating element for heating the downcomer tube and molten glass flowing through the downcomer tube. Various embodiments of downcomers for glass forming apparatuses and glass forming apparatuses comprising the same will be described herein with specific reference to the appended drawings.

Directional terms as used herein—for example up, down, upper, lower, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
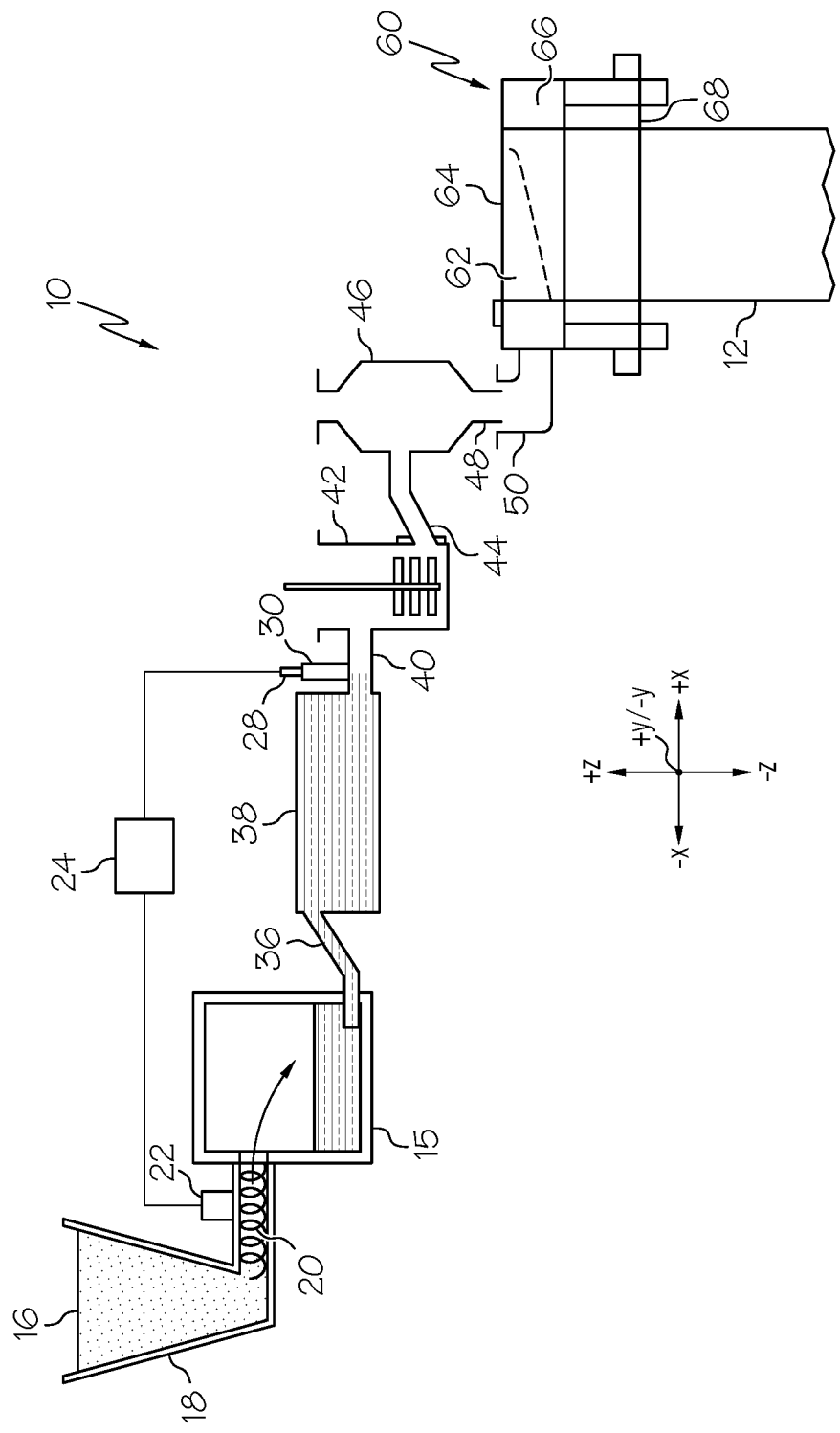
FIG. 1 schematically depicts a glass forming apparatus according to one or more embodiments shown and described herein.

Referring now to FIG. 1, an exemplary glass forming apparatus 10 for making glass articles, such as a glass ribbon 12, is schematically depicted. The glass forming apparatus 10 may generally include a melting vessel 15 configured to receive batch material 16 from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass forming apparatus 10 can also include a fining vessel 38, such as a fining tube, coupled to the melting vessel 15 by way of a first connecting tube 36. A mixing vessel 42 is coupled to the fining vessel 38 with a second connecting tube 40. A delivery vessel 46 is coupled to the mixing vessel 42 with a delivery conduit 44. As further illustrated, a downcomer 48 is positioned to deliver molten glass from the delivery vessel 46 to a forming body inlet 50 of a forming body 60. The forming body 60 comprises a trough 62 and a pair of weirs 64 (one shown in FIG. 1) bounding the trough 62. A pair of forming surfaces 66 (one shown in FIG. 1) extend in the downward vertical direction (i.e., the −Z direction of the coordinate axes depicted in the figures) from the pair of weirs 64 and converge at a bottom edge (root) 68 of the forming body 60. In the embodiments shown and described herein, the forming body 60 is a fusion-forming vessel. In operation, molten glass from the delivery vessel 46 flows through the downcomer 48, the forming body inlet 50 and into the trough 62. Molten glass in the trough 62 flows over the pair of weirs 64 bounding the trough 62 and down (−Z direction) the pair of forming surfaces 66 extending from the pair of weirs 64 before converging at the root 68 to form a glass ribbon 12.

The melting vessel 15 is typically made from a refractory material, such as refractory (e.g., ceramic) brick. The glass forming apparatus 10 may further include components that are typically made from materials stable at high temperatures, illustratively refractory metals. Such refractory metals may include platinum or platinum alloys, for example an alloy including platinum in a range from about 70% to about 100%, for example less than 100%, and rhodium in a range from about 30%, for example less than 30%, to about 0%. Other suitable refractory metals may include, without limitation, molybdenum, palladium, rhenium, tantalum, titanium, tungsten, ruthenium, osmium, zirconium, and alloys thereof and/or zirconium dioxide. The refractory metal-containing components can include one or more of the first connecting tube 36, the fining vessel 38, the second connecting tube 40, the standpipe 30, the mixing vessel 42, the delivery conduit 44, the delivery vessel 46, the downcomer 48 and the forming body inlet 50.

In current glass forming apparatuses, the downcomer includes a downcomer tube with at least one heating element extending around the downcomer tube to provide heat to the downcomer tube and molten glass flowing through the downcomer tube. The downcomer tube may also include an exposed, unheated portion that bridges the space between the heated portion of the downcomer tube and the inlet end of the forming body. It has been found that the exposed, unheated portion of the downcomer tube and molten glass flowing within the exposed portion of the downcomer tube may be subject to large temperature gradients as the glass loses thermal energy as it flows through the exposed, unheated portion of the downcomer tube and into the inlet of the forming body. The large temperature gradients in the molten glass flowing in the exposed, unheated portion of the downcomer tube result in large viscosity variations and difficulty in controlling the flow of the molten glass in the exposed, unheated portion of the downcomer tube, particularly when multiple glasses are used in a given glass ribbon forming campaign. For example, if multiple glasses are used during a glass ribbon forming campaign, different glass viscosities may be used to balance the molten glass flow through the downcomer and rapid variation of glass viscosity over a relatively short period of time (also known as "glass pulsating") may occur. Glass pulsating may degrade attributes of the resultant glass ribbon, such as wedge or thickness, and increase manufacturing losses. The embodiments described herein relate to downcomer tubes which mitigate heat loss from the molten glass as it flows into the inlet of the forming body, thereby improving glass flow stability and decreasing manufacturing losses due to wedge or thickness variations.

Referring now to FIGS. 1 and 2, FIG. 2 schematically depicts an exemplary downcomer 48 according to one or more embodiments shown and described herein. The downcomer 48 generally includes a downcomer tube 100 comprising an inlet end 101 and an outlet end 109. In embodiments, the downcomer tube 100 may include a first section 102, a second section 104 located downstream (−Z direction of the coordinate axes depicted in the figures) from the first section 102 and a transition section 106 positioned between the first section 102 and the second section 104. An upper heating zone 110 and a lower heating zone 150 positioned downstream from the upper heating zone 110 encircle the downcomer tube 100. In some embodiments, the upper heating zone 110 encircles the first section 102, transition section 106 and a portion of the second section 104 of the downcomer tube 100, and the lower heating zone 150 encircles a portion of the second section 104 of the downcomer tube 100 downstream from the upper heating zone 110. In some embodiments, the upper heating zone 110 encircles the first section 102 and the transition section 106, and the lower heating zone 150 encircles a portion of the second section 104 of the downcomer tube 100 downstream from the upper heating zone 110. In some embodiments, the upper heating zone 110 encircles the first section 102 of the downcomer tube 100 and the lower heating zone 150 encircles the transition section 106 and a portion of the second section 104. The upper heating zone 110 may include insulation 120 positioned around the downcomer tube 100 and at least one heating element 122 positioned around the downcomer tube 100. Optionally, the upper heating zone 110 may include an outer cladding 124 positioned around the insulation 120. In embodiments, the outer cladding 124 forms an upper controlled atmosphere enclosure 125 positioned around and sealed to the downcomer tube 100 in the upper heating zone 110. The lower heating zone 150 includes insulation 154 positioned around the downcomer tube 100 and at least one heating element 156 positioned around the downcomer tube 100. A second controlled atmosphere enclosure 155 is positioned around and sealed to the downcomer tube 100 in the lower heating zone 150.

In embodiments, a transition flange 126 is coupled to and encircles the downcomer tube 100 between the upper heating zone 110 and the lower heating zone 150. In addition, a bottom flange 160 positioned downstream from the transition flange 126 is coupled to and encircles the downcomer tube 100. An outer shield 158 encircles the downcomer tube 100 and is connected to the transition flange 126 and the bottom flange 160. The outer shield 158, transition flange 126 and bottom flange 160 form the lower controlled atmosphere enclosure 155. In some embodiments, the upper zone controlled atmosphere enclosure 125 is fluidly coupled to the lower controlled atmosphere enclosure 155, i.e., the transition flange 126 does not seal the lower controlled atmosphere enclosure 155 from the upper controlled atmosphere enclosure 125. In such embodiments, a controlled atmosphere gas flows between the upper controlled atmosphere enclosure 125 and the lower controlled atmosphere enclosure 155 and the flow of the lower controlled atmosphere gas in the upper controlled atmosphere enclosure 125 and the lower controlled atmosphere enclosure 155 is not independently controlled. In other embodiments, the upper controlled atmosphere enclosure 125 is not fluidly coupled to the lower controlled atmosphere enclosure 155, i.e., the transition flange 126 seals the lower controlled atmosphere enclosure 155 from the upper controlled atmosphere enclosure 125. In such embodiments, flow of a controlled atmosphere gas in the upper controlled atmosphere enclosure 125 is independently controlled from flow of a controlled atmosphere gas in the lower controlled atmosphere enclosure 155.

In embodiments, the first section 102 of the downcomer tube 100 has a first diameter $D_1$ and the second section 104 of the downcomer tube 100 has a second diameter $D_2$ that is less than the diameter $D_1$. In such embodiments, the first section 102 of the downcomer tube 100 is joined to the second section 104 of the downcomer tube 100 through the transition section 106. The transition section 106 comprises a first edge 105 including the first diameter $D_1$ which is coupled to (or integrally formed with) the first section 102 and a second edge 107 including the second diameter $D_2$ which is coupled to (or integrally formed with) the second section 104. That is, the transition section 106 joins the first section 102 to the second section 104 such that a continuous fluid pathway is provided through the downcomer tube 100 from the delivery vessel 46 to the forming body inlet 50. Although FIG. 2 shows the downcomer tube 100 with two sections having different diameters, i.e., the first section 102 with diameter $D_1$ and the second section 104 with diameter $D_2$ that is less than $D_1$, it should be appreciated that other configurations of the downcomer tube 100 are contemplated and possible. For example, in some embodiments (not shown) the downcomer tube 100 may have a constant diameter along its entire length (Z direction) or may have more than two sections with different diameters.

Still referring to FIGS. 1 and 2, the at least one heating element 122 of the upper heating zone 110 is disposed around the downcomer tube 100 thereby heating the downcomer tube 100 and molten glass flowing there through. In embodiments, the at least one heating element 122 encircles the downcomer tube 100 in a winding, helical or toroidal configuration along a length (Z direction) of the downcomer tube 100. In some embodiments, the at least one heating element 122 is in direct contact with the exterior surface of the downcomer tube 100 while, in other embodiments, the at least one heating element 122 is spaced apart from the exterior surface of the downcomer tube 100. For example, in some embodiments, there is a space between the at least one heating element 122 and the exterior surface of the downcomer tube 100. In some embodiments this space may be filled with, for example, a thin layer of refractory material, such as when the at least one heating element 122 is embedded within the insulation 120.

The upper heating zone 110 may optionally include one or more sub-heating zones, for example, a first sub-heating zone 112, a second sub-heating zone 114, a third sub-heating zone 116 and a fourth sub-heating zone 118. Each of the sub-heating zones 112, 114, 116, 118 may include insulation 120 and at least one heating element 122. In embodiments, each of the sub-heating zones 112, 114, 116, 118 are independently controlled to provide heat to a portion of the downcomer tube 100. In other embodiments, two or more of the sub-heating zones 112, 114, 116, 118 are controlled dependently to provide heat to a portion of the downcomer tube 100. Although FIG. 2 shows four sub-heating zones 112, 114, 116, 118, it should be appreciated that the upper heating zone 110 may have only one heating zone or more than four sub-heating zones so long as the one heating zone or the more than four sub-heating zones provide heat to a portion of the downcomer tube 100.

The at least one heating element 156 of the lower heating zone 150 is disposed around the downcomer tube 100, e.g., disposed around a portion of the second section 104 of the downcomer tube 100, thereby heating the downcomer tube 100 and molten glass flowing there through. In embodiments, the at least one heating element 156 encircles the downcomer tube 100 in a winding, helical or toroidal configuration along a length (Z direction) of the downcomer tube 100, e.g., along the length of the second section 104 of the downcomer tube 100. In some embodiments, the at least one heating element 156 is in direct contact with the exterior surface of the downcomer tube 100 while, in other embodiments, the at least one heating element 156 is spaced apart from the exterior surface of the downcomer tube 100. For example, in some embodiments, there is a space between the at least one heating element 156 and the exterior surface of the downcomer tube 100. In some embodiments this space may be filled with, for example, a thin layer of refractory material, such as when the at least one heating element 156 is embedded within the insulation 154.

Although FIG. 2 shows the lower heating zone 150 as including only one heating zone (i.e., the heating zone within the lower controlled atmosphere enclosure 155), it should be appreciated that the lower heating zone 150 may include two or more sub-heating zones that provide heat to a portion of the second section 104 of the downcomer tube 100 and the molten glass flowing there through.

In embodiments, the upper controlled atmosphere enclosure 125, the lower controlled atmosphere enclosure 155, or both the upper controlled atmosphere enclosure 125 and the lower controlled atmosphere enclosure 155 may be a sealed volume filled with an inert gas, such as nitrogen, argon, or the like, which can prevent degradation (such as by oxidation) of the downcomer tube 100 at the elevated operational temperatures of the glass forming apparatus 10 and avoid blister formation in the glass. In some embodiments, the sealed volume of the upper controlled atmosphere enclosure 125, the lower controlled atmosphere enclosure 155, or both the upper controlled atmosphere enclosure 125 and the lower controlled atmosphere enclosure 155 may be under vacuum which, like an inert atmosphere, prevents degradation (such as by oxidation) of the downcomer tube 100 at the elevated operational temperatures of the glass forming apparatus 10. The sealed volume of the upper controlled atmosphere enclosure 125, the lower controlled atmosphere enclosure 155, or both the upper controlled atmosphere enclosure 125 and the lower controlled atmosphere enclosure 155 can prevent the inward permeation of hydrogen through the wall of the downcomer tube 100 and into the molten glass, which mitigates blister formation in the glass.

In embodiments, the at least one heating element 156 of the lower heating zone 150 located within the lower controlled atmosphere enclosure 155 can be coupled to the at least one heating element 122 of the upper heating zone 110. Coupling the at least one heating element 156 of the lower heating zone 150 to the at least one heating element 122 of the upper heating zone 110 can decrease the amount of weight supported by the transition flange 126, mitigating the risk of damage and/or failure of the transition flange 126 as the flange expands and contracts, as described further herein.

Figure 3:
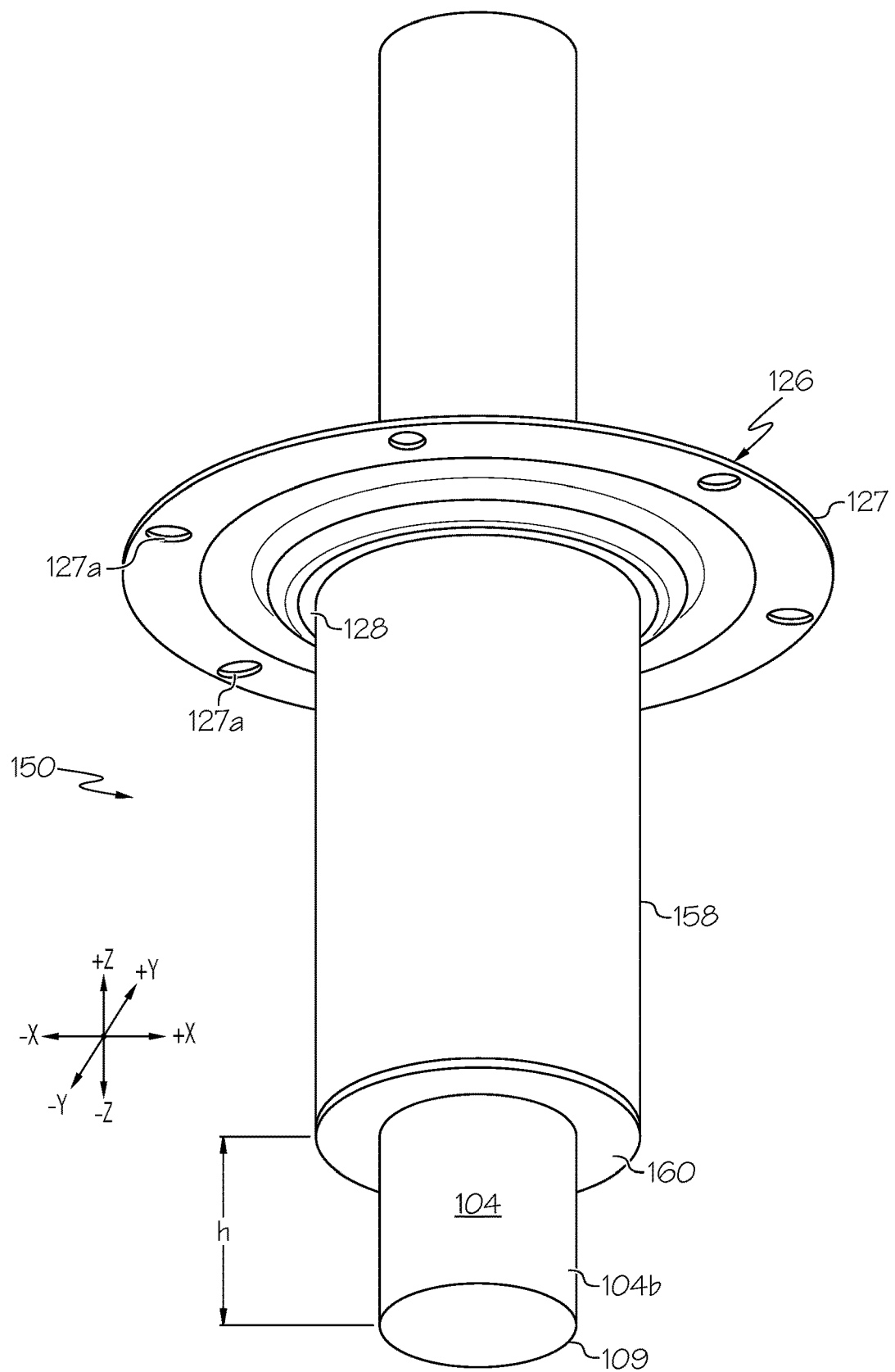
FIG. 3 schematically depicts a perspective view of a portion of the downcomer of FIG. 2 with the lower heating zone extending around a downcomer tube according to one or more embodiments shown and described herein.
Figure 4:
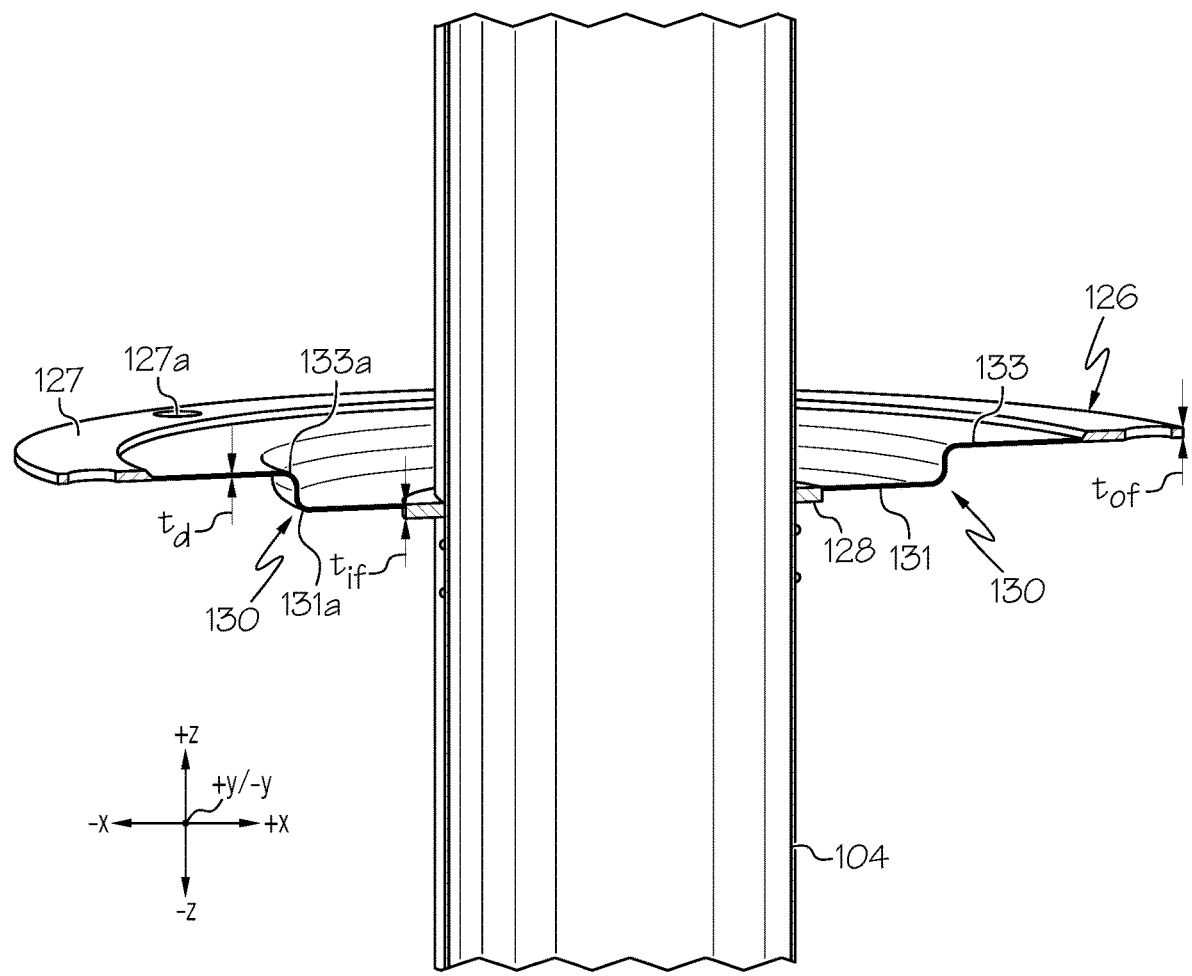
FIG. 4 schematically depicts a cross section of the downcomer tube and a transition flange shown in FIG. 3 according to one or more embodiments shown and described herein.

Referring now to FIGS. 1-4, in embodiments, the transition flange 126 is constructed to support at least a portion of the weight of the lower controlled atmosphere enclosure 155 and compensate for thermal expansion of the downcomer tube 100 during glass manufacturing and thereby preserve the structural integrity of the downcomer tube 100. Accordingly, in some embodiments, the transition flange 126 can include an outer flange 127, an inner flange 128, and an expansion drum 130 (FIG. 4). In some embodiments, the inner flange 128 can be sealingly coupled to the downcomer tube 100. Specifically, the expansion drum 130 can extend around and be sealingly coupled to the inner flange 128 such as by welding, brazing or the like. In some embodiments, the inner flange is not sealingly coupled to the downcomer tube 100. Accordingly, the outer flange 127 can extend around and be sealingly coupled to the expansion drum 130, such as by welding, brazing or the like. The outer flange 127 may be attached to the upper heating zone 110 as depicted in FIG. 2, wherein at least a portion of the insulation 120 is supported on the outer flange 127. In embodiments, the outer flange 127 is attached to the upper heating zone 110 using threaded fasteners (not shown) extending through apertures 127a. The outer shield 158 of the lower controlled atmosphere enclosure 155 may be coupled to the inner flange 128, such as by welding and/or brazing. The outer flange 127 comprises a thickness $t_{of}$, the inner flange 128 comprises a thickness $t_{if}$ and the expansion drum 130 comprises a thickness $t_d$. The thickness $t_{of}$ may be greater than $t_d$ and may be equal to or greater than $t_{if}$. The thickness $t_{if}$ may be greater than $t_d$ and may be equal to or less than $t_{of}$. In embodiments, the thickness $t_{of}$ of the outer flange 127 can be between about 1 mm to about 10 mm, the thickness $t_{if}$ of the inner flange 128 can be between about 0.2 mm and about 5 mm, and the thickness $t_d$ of the expansion drum 130 can be between about 0.1 mm and about 2 mm.

In embodiments, expansion of the second section 104 of the downcomer tube 100 due to temperature fluctuations during a glass ribbon forming campaign may be accommodated by the transition flange 126. More specifically, the expansion drum 130 can be integrally formed with an upper portion 133 and a lower portion 131 which transitions into the upper portion 133 through a pair of shoulders 131a, 133a, arranged, for example, in an "S" configuration. The upper portion 133 can be sealingly coupled to the outer flange 127 and the lower portion 131 can be sealingly coupled to the inner flange 128. Accordingly, expansion and contraction of the downcomer tube 100 and the inner flange 128 in the Z-direction and in the X-Y plane can be translated to the expansion drum 130 which, due to its decreased thickness, deforms about the shoulders 131a and 133a, thereby accommodating for the expansion and contraction of the downcomer tube 100 while still maintaining a seal with the outer shield 158. Particularly, if the second section 104 moves relative to the upper heating zone 110, e.g., due to expansion or contraction of the second section 104 during a glass ribbon forming campaign, the expansion drum 130 is sufficiently flexible to accommodate movement of the inner flange 128 (attached to the second section 104 of the downcomer tube 100) such that lateral forces between the second section 104 and the upper heating zone 110 or between the lower heating zone 150 and the upper heating zone 110 are minimized.

In some embodiments, the bottom flange 160 (and, hence, the lower controlled atmosphere enclosure 155) may be positioned at the outlet end 109 of the downcomer tube 100. In some embodiments, the bottom flange 160 (and, hence, the lower controlled atmosphere enclosure 155) may be spaced apart from the outlet end 109 of the downcomer tube 100 by a distance 'h'. For example, the distance h may be from about 10 to about 100 millimeters (mm). In some embodiments, the distance h may be from about 25 to about 75 millimeters (mm). Accordingly, a non-insulated portion 104b of the second section 104 of the downcomer tube 100 may extend downstream from the lower heating zone 150, as depicted in FIGS. 2 and 3. Spacing the bottom flange 160 apart from the outlet end 109 of the downcomer tube 100 can prevent wetting of the bottom flange 160 with molten glass and, in turn, prevent degradation of the bottom flange 160 and resultant contamination of molten glass flowing from the outlet end 109 of the downcomer tube 100. In addition, for some applications, the outlet end 109 of the downcomer tube 100 may be immersed in molten glass. Spacing the bottom flange 160 from the immersed outlet end 109 avoids contact between the molten glass and the at least one heating element 156 and, as a result, can prevent high current densities and power fluctuations in the at least one heating element 156 which may lead to premature heating element failure. In some embodiments, the bottom flange 160 can be welded to the outer shield 158 of the lower controlled atmosphere enclosure 155. In some embodiments, the bottom flange 160 can be formed integral with the outer shield 158, e.g., when the outer shield 158 and the bottom flange 160 are formed using a deep drawing metal forming process.

In some embodiments, an insulation layer 162 with insulation 164 may extend around at least a portion of the lower controlled atmosphere enclosure 155. For example, the insulation layer 162 may be disposed proximate the transition flange 126, thereby providing additional insulation to portions of the lower controlled atmosphere enclosure 155.

Figure 5:
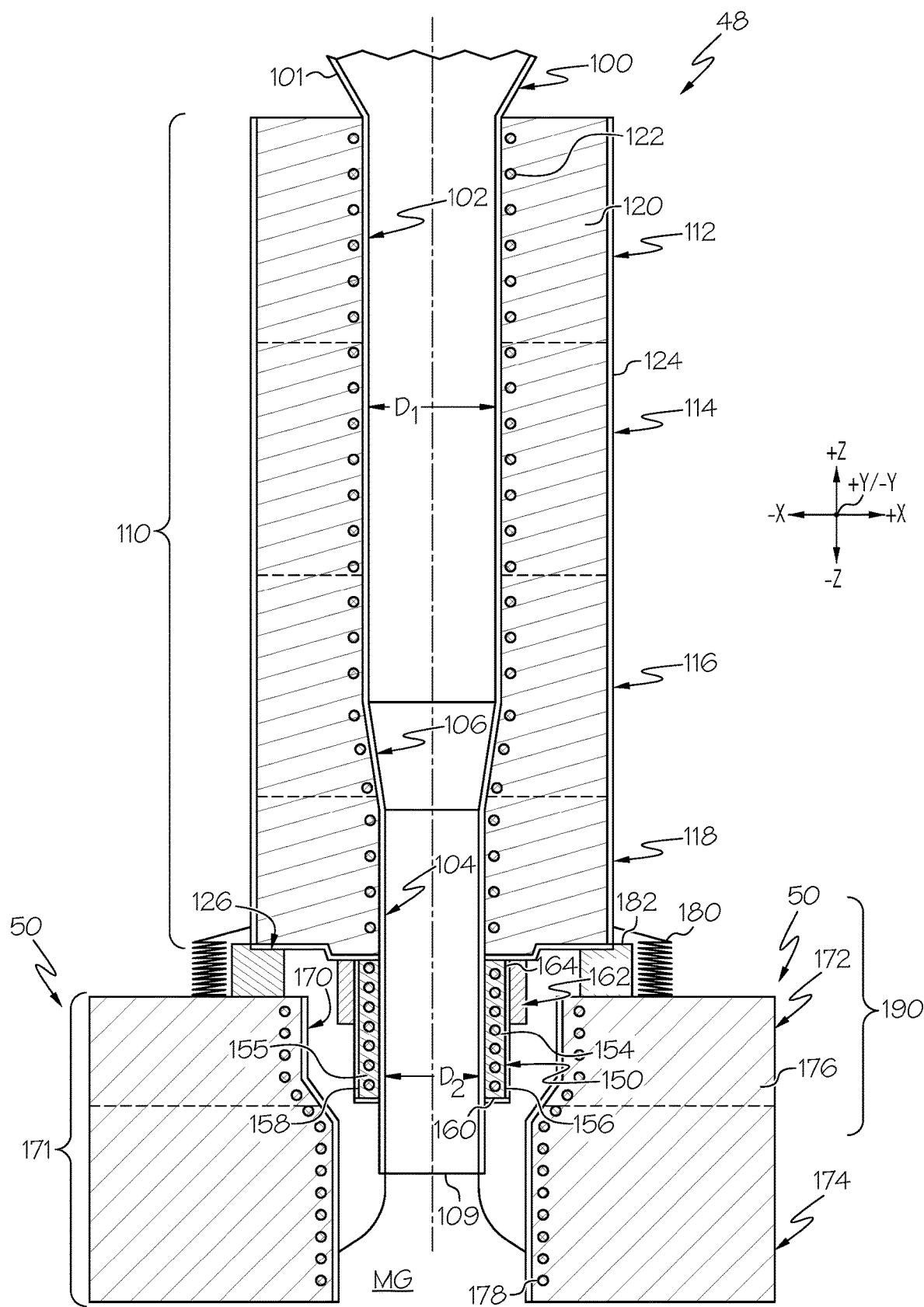
FIG. 5 schematically depicts a downcomer and a forming body inlet according to one or more embodiments shown and described herein.

Referring now to FIGS. 1-5, a cross-section of a transition region 190 where the downcomer 48 is inserted at least partially within the forming body inlet 50 is schematically depicted in FIG. 5. Particularly, the transition region 190 can include a lower portion of the upper heating zone 110, the lower heating zone 150 (FIG. 2), at least a portion of the non-insulated portion 104b of the second section 104 of the downcomer tube 100 and a portion of the forming body inlet 50 with an inlet tube 170. In embodiments, the transition flange 126 may have a diameter greater than a diameter of the inlet tube 170 such that the transition flange 126 is positioned above the inlet tube 170 (+Z direction), while the bottom flange 160 and lower controlled atmosphere enclosure 155 have diameters such that the bottom flange 160 and lower controlled atmosphere enclosure 155 are positioned within the inlet tube 170. In some embodiments, the bottom flange 160 and the lower controlled atmosphere enclosure 155 can have diameters that are substantially equal. Also, the insulation layer 162 may have a diameter such that the insulation layer 162 is positioned within the inlet tube 170. As depicted in FIG. 5, at least a portion of the second section 104 of the downcomer tube 100 and the lower controlled atmosphere enclosure 155 can be positioned in the forming body inlet 50. The lower controlled atmosphere enclosure 155 facilitates heating the molten glass as it flows through the downcomer tube 100 and into the forming body inlet 50, thereby mitigating heat loss from the molten glass and, in addition, mitigating pulsing of the molten glass flow. In embodiments, the insulation layer 162 can extend around a portion of the lower heating zone 150, as described hereinabove, to mitigate heat loss from portions of the lower controlled atmosphere enclosure 155 in the transition region 190. The forming body inlet 50 may include the inlet tube 170 surrounded by a third heating zone 171 operable to provide heat to the inlet tube 170. For example, the third heating zone 171 can be disposed downstream (−Z direction) of the upper heating zone 110 and may at least partially overlap with and extend around the lower heating zone 150. The third heating zone 171 may include insulation 176 and at least one heating element 178. In embodiments, the third heating zone 171 may optionally include a first sub-heating zone 172 and a second sub-heating zone 174. Each of the sub-heating zones 172, 174 may include the insulation 176 and the at least one heating element 178. The first sub-heating zone 172 and the second sub-heating zone 174 may be independently controlled, or in the alternative, may be controlled as one heating zone.

In embodiments, the at least one heating element 178 can be disposed around the inlet tube 170, thereby heating the inlet tube 170 and molten glass flowing there through. In some embodiments, the at least one heating element 178 is in direct contact with the exterior surface of the inlet tube 170 while, in other embodiments, the at least one heating element 178 may be spaced apart from the exterior surface of the inlet tube 170. For example, in some embodiments, there may be a space between the at least one heating element 178 and the exterior surface of the inlet tube 170. In some embodiments this space may be filled with, for example, a thin layer of refractory material, such as when the at least one heating element 178 is embedded within the insulation 176 positioned in the third heating zone 171.

In embodiments, a bellows 180 and insulation 182 may be positioned between the upper heating zone 110 and the third heating zone 171, thereby coupling the downcomer tube 100 to the forming body inlet 50. The bellows 180 and insulation 182 extend around at least a portion of the lower heating zone 150. The bellows 180 may be an accordion structure, which accommodates the differential in thermal expansion between the forming body inlet 50 and the downcomer tube 100 during operation of the glass forming apparatus 10. The insulation 182 may be, for example, a flexible, blanket-type insulation which may also accommodate the differential in thermal expansion between the forming body inlet 50 and the downcomer tube 100 during operation of the glass forming apparatus 10. In embodiments, the insulation 182 may be, for example, Fiberfrax® ceramic fiber blanket insulation or a similar blanket-type insulation. The bellows 180 and insulation 182 can also assist in controlling temperature gradients in the area surrounding the intersection of the downcomer tube 100 with the forming body inlet 50.

In the embodiments described herein, the first section 102, second section 104 and transition section 106 of the downcomer tube 100 and the inlet tube 170 may be formed from a material that is resistant to degradation at elevated temperatures such that the downcomer tube 100 and the inlet tube 170 do not readily degrade (such as by oxidation) and contaminate molten glass flowing through the downcomer tube 100 and the inlet tube 170. Suitable materials include, without limitation, platinum or platinum alloys, for example alloys comprising platinum in an amount from about 70% to about 100% and rhodium in a range from about 30% to about 0%. The at least one heating element 122, the at least one heating element 156 and the at least one heating element 178 may be in the form of wire, rod, etc., made from an electrical resistance heating element material. Suitable electrical resistance heating materials include, without limitation, platinum, platinum alloys, molybdenum disilicide, Kanthal APM, Kanthal A-1 and Kanthal A. The insulation 120 in the upper heating zone 110, the insulation 154 in the lower heating zone 150, the insulation 164 in the insulation layer 162 and the insulation 176 in the third heating zone 171 may be a refractory material. Suitable refractory materials include, without limitation, IFB2300, IFB2600, IFB2800, IFB3000, NA33, Duraboard 3000, Fiberfax Duraboard 3000, Fiberfax 2300, Fiberfax 2600, Fiberfax 3000, Alundum 485, Alundum 498, EA 139 cement, EA 198 cement, Durablanket 2600 6# and Altra KVS 161. The outer cladding 124 of the upper heating zone 110 and the outer flange 127 of the transition flange 126 may be formed from a heat resistant alloy that has high temperature corrosion resistance and provides extended service life as an outer cover for the upper heating zone 110. Suitable materials include, without limitation, Haynes 230 alloy, 300 series stainless steels, 400 series stainless steels, etc. The outer shield 158 and the bottom flange 160 of the lower controlled atmosphere enclosure 155, and the inner flange 128 and the expansion drum 130 of the transition flange 126, may be formed from a material that is resistant to degradation at elevated temperatures such that the outer shield 158, the bottom flange 160, inner flange 128 and expansion drum 130 do not readily degrade (such as by oxidation) and contaminate molten glass flowing from the outlet end 109 of the downcomer tube 100 into the forming body inlet 50 or allow leakage of air into the lower controlled atmosphere enclosure 155. Suitable materials include, without limitation, platinum or platinum alloys, for example alloys comprising platinum in an amount from about 70% to about 100% and rhodium in a range from about 30% to about 0%.

Referring now to FIGS. 1 and 5, molten glass (MG in FIG. 5) exits the delivery vessel 46 through downcomer 48 and flows through the downcomer tube 100. As the molten glass flows through the first section 102 of the downcomer tube 100, the molten glass is heated in the upper heating zone 110 by the at least one heating element 122 and heat loss from the molten glass is mitigated by insulation 120. Thereafter, the molten glass flows into the second section 104 of the downcomer tube 100 surrounded by the lower controlled atmosphere enclosure 155 and towards the forming body inlet 50. An upstream portion of the lower controlled atmosphere enclosure 155 is positioned external to the forming body inlet 50 while a downstream portion of the lower controlled atmosphere enclosure 155 is positioned within the forming body inlet 50. The molten glass flowing through the second section 104 surrounded by the lower controlled atmosphere enclosure 155 is heated by the at least one heating element 156 positioned in the lower controlled atmosphere enclosure 155 and heat loss from the molten glass is mitigated by the insulation 154 of the lower controlled atmosphere enclosure 155.

In particular, heat loss from the molten glass in the upstream portion of the lower controlled atmosphere enclosure 155 external to the forming body inlet 50 can be mitigated by heating the molten glass with the at least one heating element 156 positioned in the lower controlled atmosphere enclosure 155, thereby maintaining the viscosity and flow characteristics of the molten glass as the molten glass transitions from the downcomer 48 to the forming body inlet 50. Further, heat loss from the molten glass in the downstream portion of the lower controlled atmosphere enclosure 155 can be mitigated by heating the molten glass with the at least one heating element 156 positioned in the lower controlled atmosphere enclosure 155, which heating can be supplemented by heating with the at least one heating element 178 located in the forming body inlet 50 (i.e., the at least one heating element 178 in the third heating zone 171), thereby maintaining the viscosity and flow characteristics of the molten glass as the molten glass exits the downcomer tube 100 and flows into the forming body inlet 50.

In addition to heating the molten glass flowing through the downcomer tube 100, the sealed volume of the lower controlled atmosphere enclosure 155 mitigates degradation of the downcomer tube 100 during operation of the glass forming apparatus 10 by reducing, such as by preventing, oxidation of the downcomer tube 100 in the region between the downcomer 48 and the forming body inlet 50. Further, the lower controlled atmosphere enclosure 155 mitigates hydrogen permeation through the downcomer tube 100, thereby reducing the risk of blister defects in the glass.

After entering the forming body inlet 50, the molten glass flows into the trough 62 of the forming body 60. The molten glass in the trough 62 flows over the pair of weirs 64 bounding the trough 62 and down (−Z direction) the pair of forming surfaces 66 converging at the root 68 of the forming body 60 forming the glass ribbon 12 which is drawn from the root 68.

EXAMPLES

The embodiments described herein will be further clarified by the following examples.

Comparative Example 1

Figure 6A:
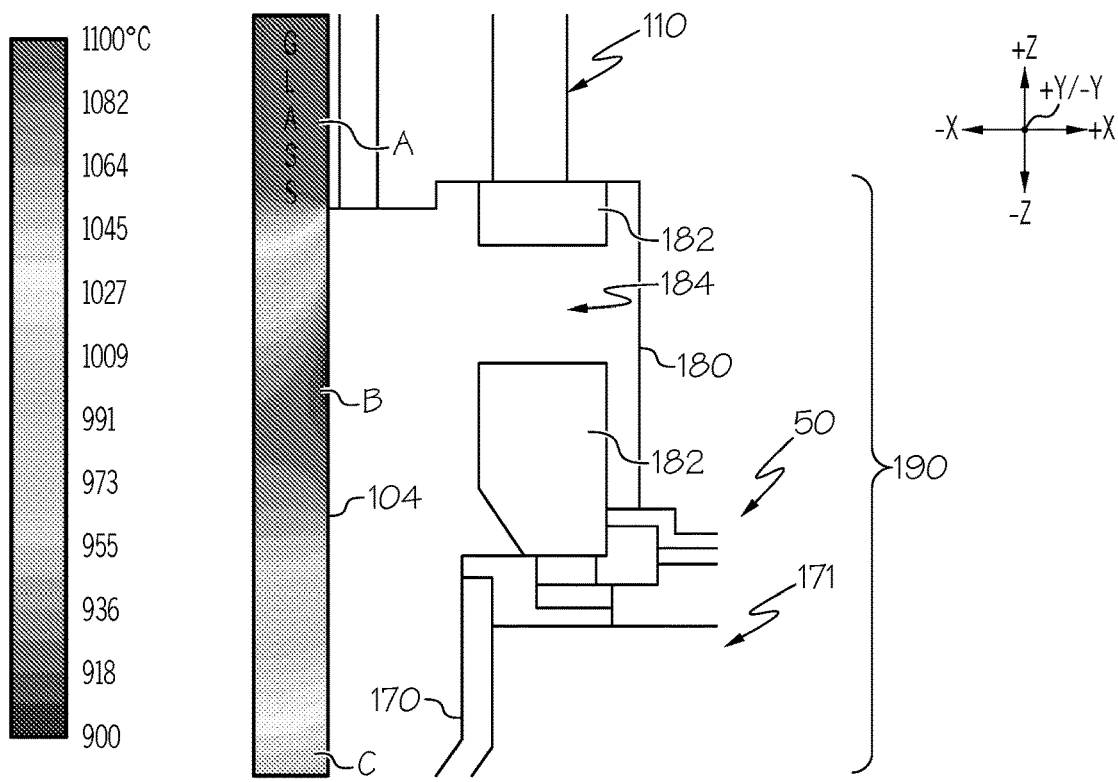
FIG. 6A graphically depicts a thermal analysis model for a transition region with a downcomer and a forming body inlet without a lower heating zone positioned around a downcomer tube.

Referring to FIGS. 5 and 6A, FIG. 6A shows a thermal analysis model for molten glass flowing through second section 104 of the downcomer tube 100 within the transition region 190 depicted in FIG. 5 without the lower heating zone 150, i.e. without the lower heating zone 150 positioned around the second section 104 of the downcomer tube 100 or the lower controlled atmosphere enclosure 155. The thermal analysis model includes the upper heating zone 110, third heating zone 171, the bellows 180 and insulation 182. The insulation 182 includes a gap 184 between the upper heating zone 110 and the third heating zone 171, i.e., the thermal analysis model simulates a gap 184 being present within the insulation 182. Temperature variation for molten glass flowing through the transition region 190 without the lower heating zone 150 positioned around the second section 104 of the downcomer tube 100 is shown in FIG. 6A. At position 'A' in FIG. 6A, the temperature of molten glass within the upper heating zone 110 is about 1100° C. At position 'B' in FIG. 6A, the temperature of molten glass between the upper heating zone 110 and the third heating zone 171, and proximate to the gap 184 in the insulation 182, is about 900° C. At position 'C' in FIG. 6A, the temperature of molten glass within the inlet tube 170 and the third heating zone 171 is about 1045° C. Accordingly, without the lower heating zone 150 positioned around the second section 104 of the downcomer tube 100, molten glass flowing through the transition region 190 decreases in temperature (−ΔT) by about 200° C. before flowing into the forming body inlet 50. It should be understood that a 200° C. drop in glass temperature increases glass viscosity levels such that the flow of molten glass within the downcomer tube 100 may become "choked." For example, model simulations (not shown) indicate only 16% of molten glass target flow through the downcomer tube 100 is achieved when the molten glass decreases in temperature by 200° C.

Example 1

Figure 6B:
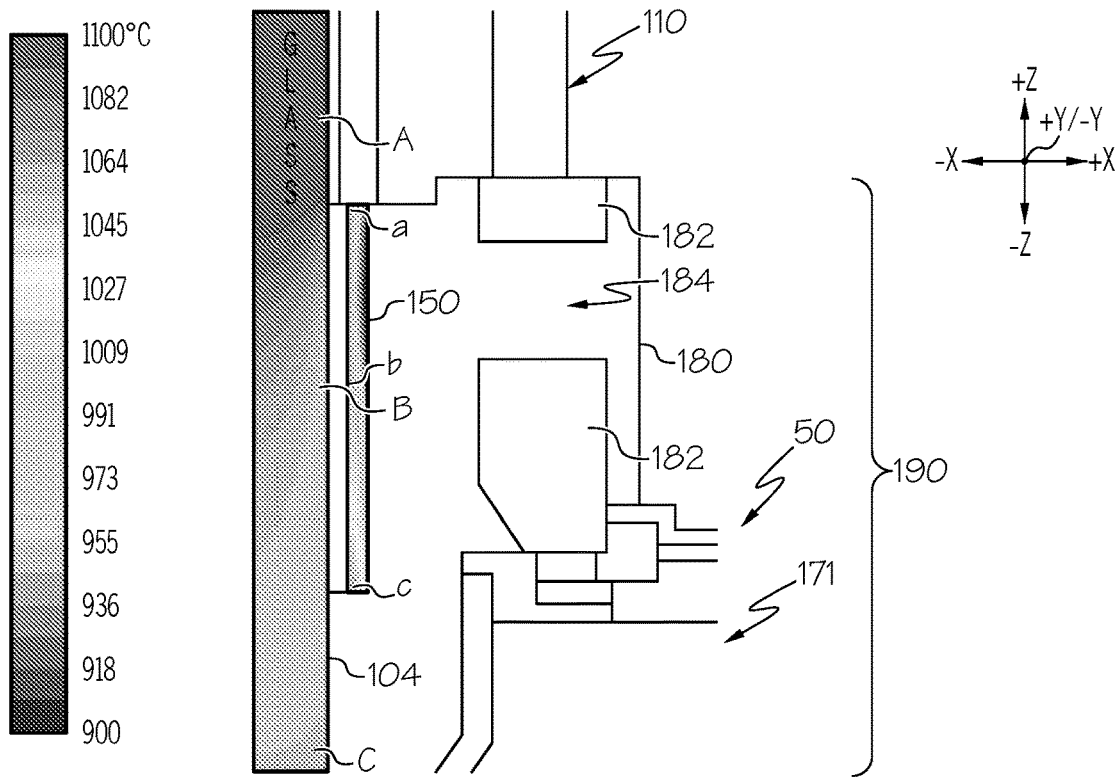
FIG. 6B graphically depicts a thermal analysis model for a transition region with a downcomer and a forming body with a lower heating zone around a downcomer tube according to one or more embodiments shown and described herein.

Referring to FIGS. 5 and 6B, FIG. 6B shows a thermal analysis model for molten glass flowing through the transition region 190 depicted in FIG. 5 with the lower heating zone 150 positioned around the second section 104 of the downcomer tube 100. The thermal analysis model includes the upper heating zone 110, lower heating zone 150, third heating zone 171, the bellows 180 and insulation 182 with the gap 184 between the upper heating zone 110 and the third heating zone 171. The thermal analysis model simulates the temperature of the lower heating zone 150 at location 'a' being about 1000° C., the temperature at location 'b' being about 1020° C. and the temperature at location 'c' being about 1050° C. The temperature of molten glass within the upper heating zone 110 at position 'A' in FIG. 6B is about 1100° C. The temperature of molten glass between the upper heating zone 110 and the third heating zone 171 at position 'B' in FIG. 6B (proximate the gap 184 in the insulation 182) is about 1050° C. The temperature of molten glass within the inlet tube 170 at position 'C' in FIG. 6B is about 1060° C. Accordingly, with the lower heating zone 150 positioned around the second section 104 of the downcomer tube 100, molten glass flowing through the transition region 190 decreases in temperature (−ΔT) by about 50° C. Compared to molten glass flowing through the transition region 190 without the lower heating zone 150 positioned around the second section 104 of the downcomer tube 100, a reduction in temperature variation of about 150° C. (~75%) is provided with the lower heating zone 150 positioned around the second section 104 of the downcomer tube 100. It should be appreciated that a reduction in temperature decrease or variation in the molten glass flowing through the transition region 190 can result in a reduction of viscosity variation in the molten glass. A summary of the temperature decrease (−ΔT) of the molten glass flowing through the second section 104 of the downcomer tube 100 in the transition region 190 for Comparative Example 1 and Example 1 is shown in Table 1 below.

TABLE 1

|  | T(° C.) at Position 'A' | T(° C.) at Position 'B' | T(° C.) at Position 'C' | Temperature Decrease −ΔT (° C.) |
| --- | --- | --- | --- | --- |
| Comparative Example 1 | 1100 | 900 | 1045 | 200 |
| Example 1 | 1100 | 1050 | 1060 | 50 |

Figure 7:
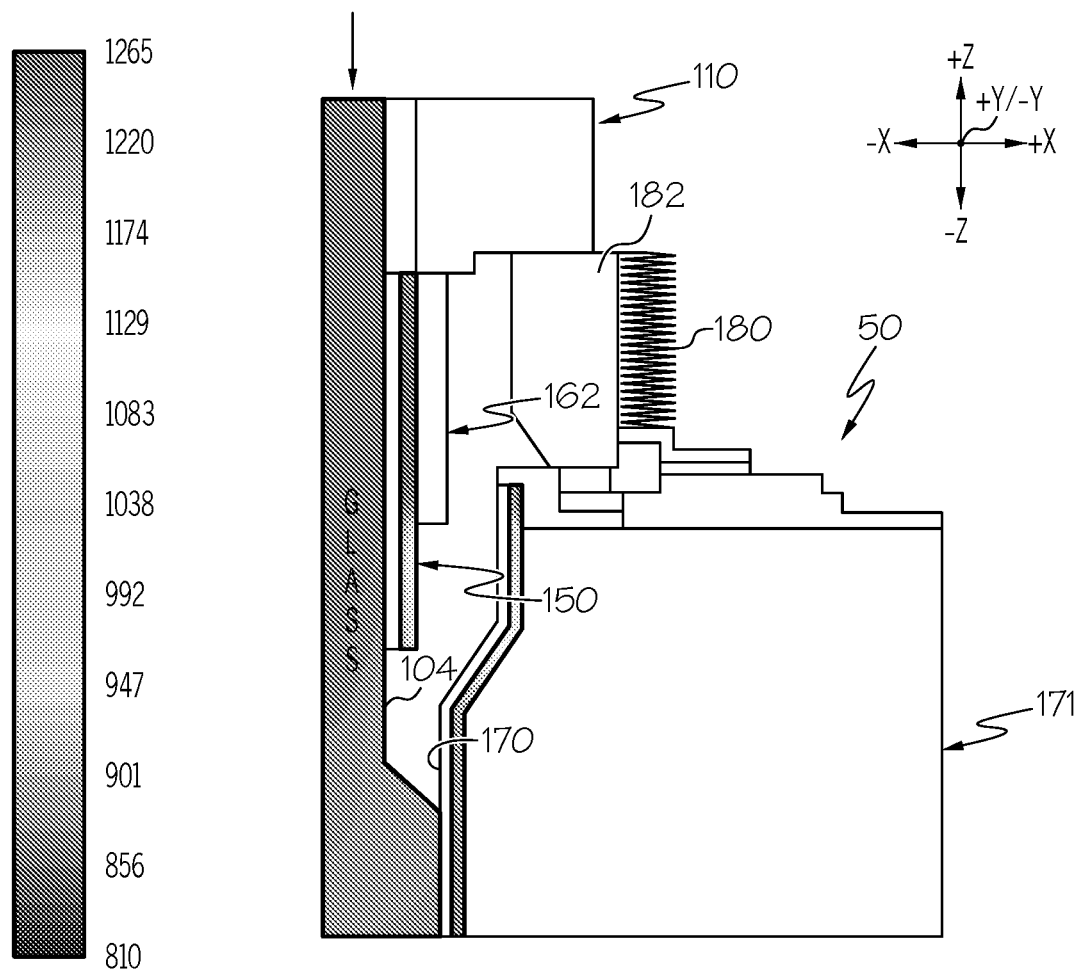
FIG. 7 graphically depicts a thermal analysis model of a transition region with a downcomer and a forming body inlet with a lower heating zone around a downcomer tube according to one or more embodiments shown and described herein.

Referring to FIGS. 5 and 7, a thermal analysis model for molten glass flowing through the transition region 190 depicted in FIG. 5 is shown in FIG. 7. Particularly, FIG. 7 shows a thermal analysis model for the transition region 190 in FIG. 5 with a portion of the second section 104 and the lower heating zone 150 positioned at least partially within the forming body inlet 50. The thermal analysis model also includes the insulation layer 162 extending around an upper portion of the lower heating zone 150.

Comparative Example 2

Figure 8A:
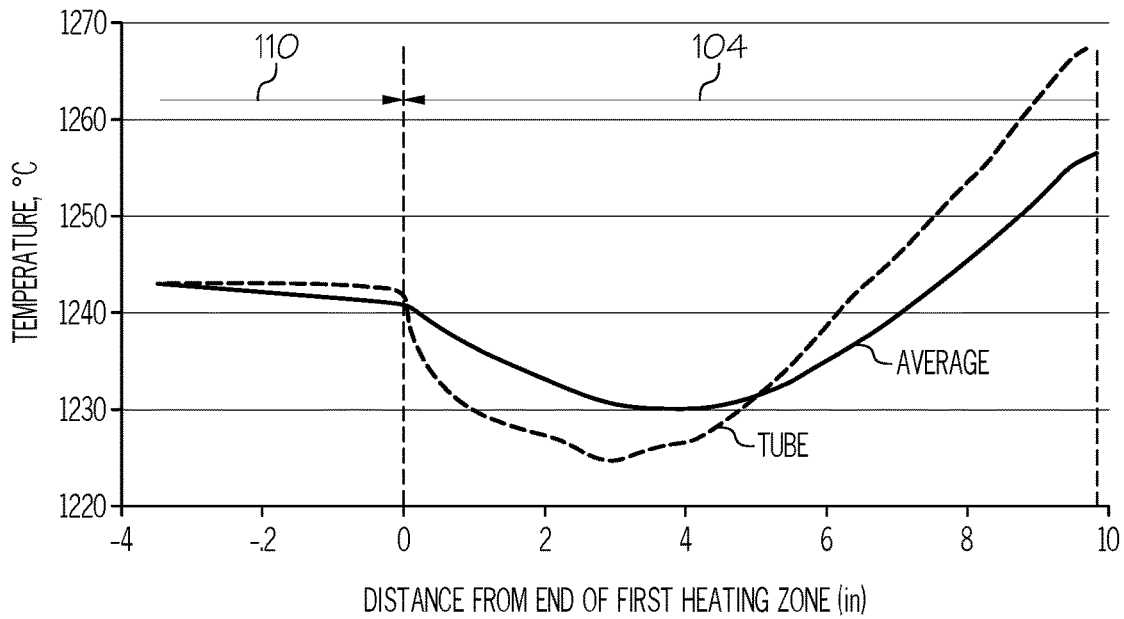
FIG. 8A graphically depicts temperature of the transition region in FIG. 7 without the lower heating zone positioned around the downcomer tube.

Referring to FIG. 7 and FIG. 8A, temperature as a function of distance along the second section 104 (Z direction) of the downcomer tube 100 in the transition region 190 for the thermal analysis model shown in FIG. 7, but without the lower heating zone 150 positioned around the second section 104 of the downcomer tube 100 (not shown in FIG. 7), is graphically depicted in FIG. 8A. Particularly, FIG. 8A graphically depicts the temperature of the second section 104 of the downcomer tube 100 (labeled 'TUBE' in the figure) and the average temperature of molten glass (labeled 'AVERAGE' in the figure) within the second section 104 as a function of position within the upper heating zone 110 (−4 to 0 inches; −10 to 0 cm; labeled "110") and downstream from the upper heating zone 110 (0 to 10 inches; 0 to 25 cm; labeled "104"). The molten glass flowing through the second section 104 of the downcomer tube 100 has a flow rate of 93.2 pounds per hour (lbs/h) (42.3 kg/hr). A power of 3230 watts (W) is applied to the third heating zone 171. The temperature of the second section 104 of the downcomer tube 100 (TUBE) and the average temperature of molten glass (AVERAGE) within the upper heating zone 110 (−4 to 0 inches; −10 to 0 cm) is about 1243° C. Without the lower heating zone 150 positioned around the second section 104 of the downcomer tube 100, the temperature of the second section 104 of the downcomer tube 100 and the average temperature of the molten glass downstream from the upper heating zone 110 decrease to about 1225° C. and 1230° C., respectively, at a distance of about 3 inches (i.e. about 8 cm) downstream from the upper heating zone 110 and increase to about 1267° C. and 1256° C., respectively, at a distance of about 10 inches (i.e., about 25 cm) downstream from the upper heating zone 110. Accordingly, the temperature variation of the second section 104 of the downcomer tube 100 and the average temperature of the molten glass downstream from the upper heating zone 110 (0 to 10 in) is about 42° C. and about 26° C., respectively.

Example 2

Figure 8B:
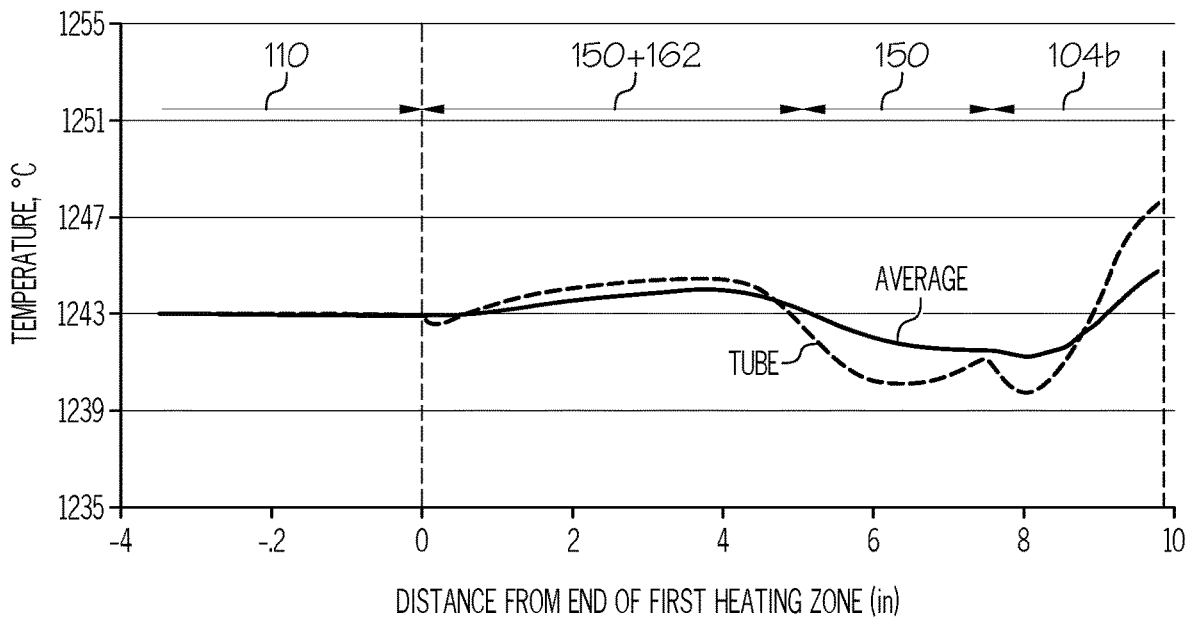
FIG. 8B graphically depicts temperature of the transition region in FIG. 7 with the lower heating zone positioned around the downcomer tube.

Referring to FIGS. 7 and 8B, FIG. 8B graphically depicts temperature as a function of distance along the second section 104 of the downcomer tube 100 in the transition region 190 for the thermal analysis model shown in FIG. 7 with the lower heating zone 150 and insulation layer 162 positioned around the second section 104 of the downcomer tube 100. FIG. 8B graphically depicts the temperature of the second section 104 of the downcomer tube 100 (labeled 'TUBE' in the figure) and the average temperature of molten glass (labeled 'AVERAGE' in the figure) within the second section 104 as a function of position within the upper heating zone 110 (−4 to 0 in, labeled "110"), downstream from the upper heating zone 110 and positioned within the lower heating zone 150 and the insulation layer 162 (0 to 5 in;

labeled "150+162"), downstream from the insulation layer 162 and positioned within the lower heating zone 150 (5 to 7.5 inches; ~13 to 19 cm; labeled "150") and downstream from the lower heating zone 150 within the non-insulated portion 104*b* of the second section 104 (7.5 to 10 inches; 19 to 25 cm; labeled "104*b*"). The molten glass flowing through the second section 104 of the downcomer tube 100 has a flow rate of 93.2 pounds per hour (lbs/h) (42.3 kg/hr). A power of 290 W is applied to the lower heating zone 150 and 2200 W of power is applied to the third heating zone 171 (total power=290 W+2200 W=2490 W). The temperature of the second section 104 of the downcomer tube 100 (TUBE) and the average temperature of molten glass (AVERAGE) within the upper heating zone 110 (−4 to 0 inches; −10 to 0 cm) is about 1243° C. The temperature of the second section 104 and the average temperature of molten glass positioned within the lower heating zone 150 and the insulation layer 162 (0 to 5 inches; 0 to 13 cm) increases to about 1245° C. and 1244° C., respectively, at a distance of about 4 inches (10 cm) downstream from the upper heating zone 110. The temperature of the second section 104 and the average temperature of the molten glass positioned within the lower heating zone 150 and downstream from the insulation layer 162 (5 to 7.5 in; 13 to 19 cm) decreases to about 1238° C. and 1241° C., respectively, at a distance of about 8 inches (20 cm) downstream from the upper heating zone 110. The temperature of the second section 104 and the average temperature of the molten glass positioned downstream from the lower heating zone 150 (7.5 to 10 inches; 19 to 25 cm) increases to about 1248° C. and 1245° C., respectively, at a distance of about 10 inches (25 cm) downstream from the upper heating zone 110. Accordingly, the temperature variation of the second section 104 of the downcomer tube 100 and the average temperature of the molten glass within the second section 104 downstream from the upper heating zone 110 (0 to 10 inches; 0 to 25 cm) is about 8° C. and about 4° C., respectively. That is, the temperature variation for the second section 104 of the downcomer tube 100 and the average temperature of the molten glass within the second section 104 downstream from the upper heating zone 110 is reduced by 35° C. and 22° C., respectively, when the lower heating zone 150 and insulation layer 162 are positioned around the second section 104 of the downcomer tube 100 compared to when the lower heating zone 150 and insulation layer 162 is not positioned around the second section 104 of the downcomer tube 100. The reduction in temperature variation can reduce glass pulsation, particularly if multiple glasses with varying viscosities are used during a glass ribbon forming campaign, thereby reducing thickness variation along (i.e., Z axis) or across (i.e., X axis) the glass ribbon and decreasing manufacturing losses. It should be appreciated that the reduction of temperature variation when the lower heating zone 150 is positioned around the second section 104 of the downcomer tube 100 can be achieved with less overall power, i.e., without the lower heating zone 150 positioned around the second section 104 of the downcomer tube 100 the power provided to the third heating zone 171 is 3230 W, and with the lower heating zone 150 positioned around the second section 104 of the downcomer tube 100 the total power provided to the lower heating zone 150 and the third heating zone 171 is only 2490 W. A summary of the temperature variation (ΔT) of the molten glass flowing through the second section 104 of the downcomer tube 100 in the transition region 190 for Comparative Example 2 and Example 2 is shown in Table 2 below.

TABLE 2

|  |  | Maximum T (° C.) | Minimum T (° C.) | ΔT (° C.) |
|---|---|---|---|---|
| Comparative Example 2 | TUBE | 1268 | 1225 | 43 |
|  | AVERAGE | 1256 | 1230 | 26 |
| Example 2 | TUBE | 1248 | 1238 | 10 |
|  | AVERAGE | 1245 | 1241 | 4 |

Based on the foregoing, it should now be understood that the downcomers and methods described herein can provide a reduction of temperature variation in molten glass flowing through a downcomer tube and into a forming body inlet. Also, the downcomers and methods described herein can provide increased control of the temperature and viscosity of molten glass flowing through a downcomer and into a forming body inlet. The downcomers and method described herein can be used to compensate for different glasses being used during a glass ribbon forming campaign and reduce or eliminate glass pulsating. The use of a downcomer tube with a lower heating zone positioned below an upper heating zone and at least partially within a forming body inlet provides local heating in the region between the upper heating zone and the forming body inlet and results in more uniform glass temperatures and glass viscosity. The manipulation of the molten glass temperature allows for manipulation of the molten glass viscosity which may be used to compensate for different glasses being processed during a given glass ribbon forming campaign.

While specific reference has been made herein to a downcomer, it should be understood that any transition system between a molten glass delivery vessel and a forming body in which reduced temperature variations in molten glass flowing from the molten glass delivery vessel, through the transition system and into the forming body is desired, are included in the embodiments shown and described herein.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A downcomer for a glass forming apparatus, the downcomer comprising:
   a downcomer tube comprising an inlet end for receiving molten glass and an outlet end for discharging molten glass to an inlet of a forming body, an upper heating zone, and a lower heating zone positioned downstream of the upper heating zone proximate the outlet end; and
   an entire lower controlled atmosphere enclosure defined by an upper seal and a lower seal and positioned around and sealed directly to an exterior surface of the downcomer tube in the lower heating zone between the inlet end and the outlet end, the lower controlled atmosphere enclosure comprising an entirety of at least one heating element.

2. The downcomer of claim 1, wherein the lower controlled atmosphere enclosure is spaced apart from the outlet end of the downcomer tube.

3. The down comer of claim 1, wherein the outlet end of the downcomer tube and the lower controlled atmosphere enclosure are positioned within the forming body inlet of the forming body.

4. The downcomer of claim 1, further comprising an insulation layer extending around at least a portion of the lower controlled atmosphere enclosure.

5. The downcomer of claim 1, wherein the lower controlled atmosphere enclosure comprises:
a transition flange coupled to and encircling the downcomer tube between the upper heating zone and the lower heating zone;
a bottom flange coupled to and encircling the downcomer tube and positioned downstream from the transition flange; and
an outer shield encircling the downcomer tube and connected to the transition flange and the bottom flange, the outer shield, transition flange, and bottom flange forming the lower controlled atmosphere enclosure around the downcomer tube.

6. The downcomer of claim 5, wherein the bottom flange is spaced apart from the outlet end of the downcomer tube by a distance between from about 25 mm to about 75 mm.

7. The down comer of claim 5, wherein the transition flange comprises an outer flange, an inner flange and an expansion drum extending from the outer flange to the inner flange, the expansion drum comprising an "S" configuration with an upper portion of the expansion drum sealingly coupled to the outer flange and a lower portion of the expansion drum sealingly coupled to the inner flange.

8. The downcomer of claim 7, wherein the expansion drum is integrally formed with the upper portion and the lower portion, and the lower portion transitions into the upper portion through a pair of shoulders arranged in the "S" configuration.

9. The downcomer of claim 7, wherein the outer flange comprises an outer flange thickness, the inner flange comprises an inner flange thickness, and the expansion drum comprises an expansion drum thickness that is less than the outer flange thickness and the inner flange thickness.

10. The downcomer of claim 7, wherein the outer flange comprises a heat resistant alloy and the inner flange and the expansion drum comprises a platinum alloy.

11. The downcomer of claim 1, wherein the lower controlled atmosphere enclosure is filled with an inert gas.

12. The downcomer of claim 1, wherein the lower controlled atmosphere enclosure is under vacuum.

* * * * *

UNITED STATES PATENT AND TRADEMARK OFFICE
CERTIFICATE OF CORRECTION

PATENT NO. : 11,242,275 B2
APPLICATION NO. : 16/469446
DATED : February 8, 2022
INVENTOR(S) : Bulent Kocatulum et al.

It is certified that error appears in the above-identified patent and that said Letters Patent is hereby corrected as shown below:

In the Claims

In Column 17, Line 4, in Claim 3, delete "down comer" and insert -- downcomer --.

In Column 18, Line 1, in Claim 7, delete "down comer" and insert -- downcomer --.

Signed and Sealed this
Twenty-fourth Day of May, 2022

*Katherine Kelly Vidal*

Katherine Kelly Vidal
*Director of the United States Patent and Trademark Office*